UNITED STATES PATENT OFFICE.

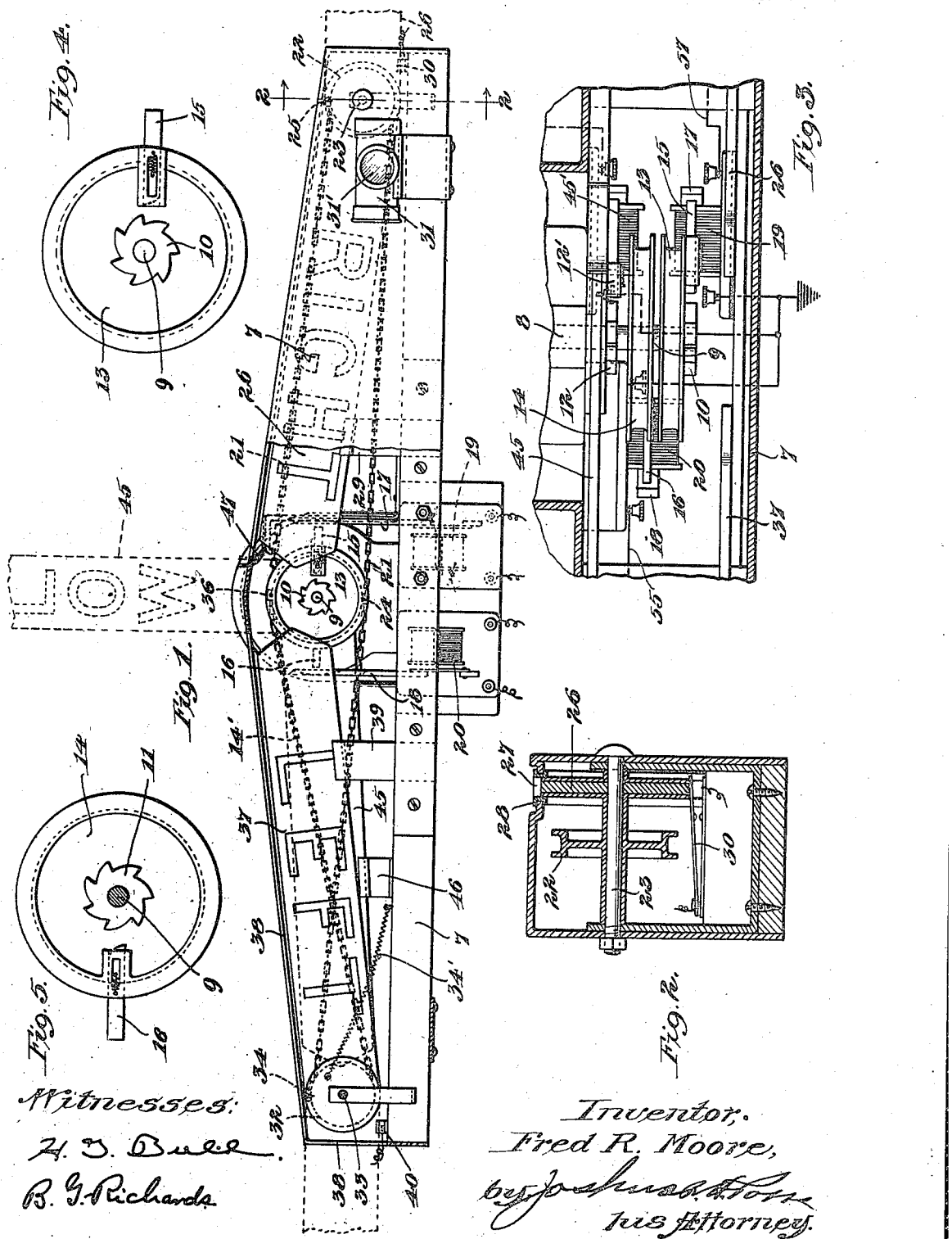

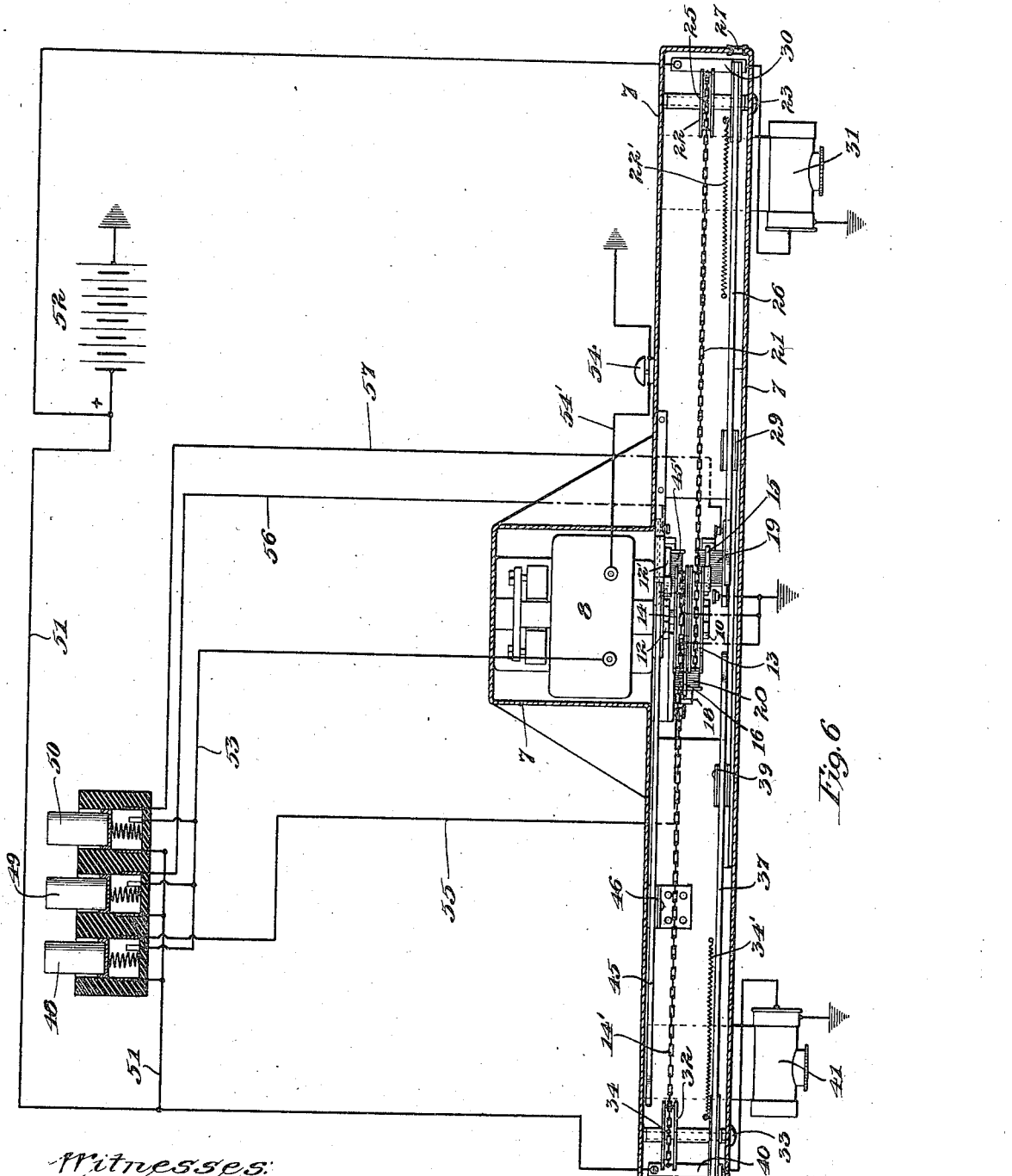

FRED R. MOORE, OF CHICAGO, ILLINOIS.

VEHICLE-SIGNAL.

1,195,837.                    Specification of Letters Patent.    Patented Aug. 22, 1916.

Application filed September 25, 1915.   Serial No. 52,683.

*To all whom it may concern:*

Be it known that I, FRED R. MOORE, a citizen of the United States, and a resident of the city of Chicago, county of Cook, and State of Illinois, have invented certain new and useful Improvements in Vehicle-Signals, of which the following is a specification.

My invention relates to improvements in vehicle signals especially adapted for use on automobiles and has for its object the provision of improved means whereby the driver of such a vehicle may indicate to those behind his future intentions.

The invention consists in the combinations and arrangements of parts hereinafter described and claimed.

The invention will be best understood by reference to the accompanying drawings, forming a part of this specification, and in which—

Figure 1 is a rear view of a signal embodying my invention, with portions thereof broken away for the sake of clearness, Fig. 2, an enlarged section taken on line 2—2 of Fig. 1, Fig. 3, an enlarged detailed section of the signal operating mechanism employed in the construction, Fig. 4, an enlarged detailed view of one of two pulley and ratchet mechanisms employed in the construction, Fig. 5, an enlarged view of the other pulley and ratchet mechanism, and Fig. 6, a horizontal section through the apparatus illustrating electric circuits employed therein diagrammatically.

The preferred form of construction as illustrated in the drawings comprises a suitable casing 7 arranged to be secured to the rear of an automobile and provided with an electric motor 8 positioned centrally therein. A shaft 9 on motor 8 is provided with three ratchet wheels 10, 11 and 12 fixed thereto, and pulleys 13 and 14 are loosely mounted on shaft 9 adjacent ratchets 10 and 11 as indicated. Pulleys 13 and 14 respectively carry spring held pawls 15 and 16 coöperating with the corresponding ratchet wheels 10 and 11 as indicated. Pawls 15 and 16 coöperate with armatures 17 and 18 operable by electro-magnets 19 and 20, the arrangement being such that upon closing of a circuit through either of said magnets the corresponding pawl will be thrown into operative engagement with the corresponding ratchet thus connecting the corresponding pulley with the motor shaft 9. The frictional engagement between the pawls 15 and 16 and the teeth of the corresponding ratchet wheel is sufficient to maintain such engagement as long as operative tension is maintained between the parts.

Pulley 13 is connected by means of a chain 21 with a pulley 22 fixed to a shaft 23 extending across the end of casing 7, said chain 21 being rigidly attached to pulley 13 at the point 24 and to pulley 22 at the point 25 so as to cause rotation of shaft 23 through one-half a revolution but to prevent further rotation thereof as will be readily understood. A signal arm 26 is fixed to shaft 23 in position to operate through a slit 27 in the top and end of casing 7, said slit being provided with a felt lining 28 so as to exclude dust from the interior of casing 7. The signal arm 22 is normally concealed within casing 7 resting upon a support 29 therein and normally held in such position by means of a spring 22' connected with arm 26 as shown. Electric contacts 30 are arranged in casing 7 in the path of arm 26 so as to be engaged thereby when said arm is thrown to its extended or operative position, said contacts 30 being connected in circuit with an electric light 31 arranged to illuminate the arm 26 for use at night, said light being also provided with a red glass 31' to operate as a danger signal. By this arrangement it will be observed that with the assistance of motor 8 and magnet 18 arm 26 will be thrown outwardly into exposed position and held in such position as long as the circuit through motor 8 is held closed, said arm returning to initial position upon breaking of the motor circuit.

Pulley 14 is connected by means of a crossed chain 14' with a pulley 32 fixed to a shaft 33 traversing the other end of casing 7, said chain 14' being fixed to pulley 32 at point 34 and to pulley 14 at point 36 so as to effect a one-half revolution on shaft 32 and prevent further revolution thereof. A signal arm 37 is fixed to shaft 33 and is arranged to operate through a slit 38 in the top and end of casing 7 in the same manner as arm 26 operates through its slit. One of said arms is marked to indicate an intention of turning to the right and the other marked to indicate an intention to turn to the left as shown.

Arm 37 normally rests upon the support 39 in casing 7 and is normally held in retracted position by means of a spring 34' connected with arm 37. Electric contacts 40 are also arranged within the path of arm 37 so as to be closed thereby and light 41 which is identical with light 31 is arranged to be operated by closing of said circuit. By this arrangement it will be observed that closing of the motor circuit and the circuit through magnet 20 will effect operation of arm 37 to indicate an intention of turning to the left. Another signal arm 45 is arranged in casing 7 on shaft 9 and carries a spring held pawl 12' coöperating with ratchet 12 and operable by means of electromagnet 45' to connect said arm with said shaft as will be readily understood. The arm 45 normally rests on a stop 46 and its upward swing is limited by a spring stop 47 which will impart initial downward swinging to signal 45 upon breaking of the circuit through motor 8, said downward movement being completed by gravity. The arm 45 is marked to indicate an intention to check the vehicle and is designed for use to indicate such intention.

The operation of arms 26, 37 and 45 is controlled by three electric push buttons 48, 49 and 50 indicated diagrammatically in Fig. 6 and designed to be arranged adjacent the driver's seat of the automobile. All of the push buttons are connected by means of a wire 51 with the positive side of a battery 52 or other source of current, the negative side of said battery being grounded as indicated. Likewise all of the push buttons 48, 49 and 50 are placed in electrical connection with the motor 8 by means of a wire 53, said motor being grounded through a bell 54 by means of a wire 54'. By this arrangement operation of any one of the push buttons 48, 49 or 50 will supply current to motor 8 and bell 54 operating both. Push button 48 is electrically connected by means of a wire 55 with electromagnet 20 and push buttons 49 and 50 are similarly connected by means of wires 56 and 57 respectively with electromagnets 45' and 19 so that operation of any one of the push buttons 48, 49 or 50 will operate the corresponding signal arm and at the same time ring the bell 54 and operate the lights 31 and 41 when arms 26 and 37 are operated, thus giving both visual and audible signals to persons behind the automobile as to the future intentions of the driver.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A signal comprising a casing; a motor in said casing provided with a shaft; a ratchet wheel fixed to said shaft; a swinging signal arm in said casing; a spring held pawl in said casing in operative relation with said ratchet and arranged to operatively connect said arm therewith; and electrical means for operating said pawl, substantially as described.

2. A signal comprising a casing and provided with a shaft; a ratchet wheel fixed to said shaft; a swinging signal arm in said casing; a spring held pawl in said casing in operative relation with said ratchet and arranged to operatively connect said arm therewith; and electrical means for simultaneously operating said pawl and closing a circuit through said motor, substantially as described.

3. A signal comprising a casing; a motor in said casing and provided with a shaft; three ratchet wheels fixed to said shaft; three swinging arms in said casing; spring held pawls in said casing coöperating with said ratchets and arranged to operatively connect each of said arms with one of said ratchets; and electrical means for operating said pawls, substantially as described.

4. A signal comprising a casing; a motor in said casing and provided with a shaft; three ratchet wheels fixed to said shaft; three swinging arms in said casing; spring held pawls in said casing coöperating with said ratchets and arranged to operatively connect each of said arms with one of said ratchets; electric lights arranged to illuminate certain of said arms; circuits for said lights arranged to be closed by swinging of the corresponding arms; and an electric bell in circuit with the motor, substantially as described.

5. A signal comprising a casing; a motor in said casing provided with a shaft; three ratchet wheels fixed to said shaft; three swinging arms in said casing; spring held pawls in said casing coöperating with said ratchet and arranged to connect each of said arms to one of said ratchets; electric lights arranged to illuminate certain of said arms;

circuits for said lights arranged to be closed by swinging of the corresponding arms; an electric bell in circuit with the motor; electromagnets arranged to operate said pawls; and means for simultaneously closing the circuit through each of said electromagnets and the motor circuit, substantially as described.

In testimony whereof I have signed my name to this specification in the presence of two subscribing witnesses.

FRED R. MOORE.

Witnesses:
JOSHUA R. H. POTTS,
CORA F. SCHIEBER.

Copies of this patent may be obtained for five cents each, by addressing the "Commissioner of Patents, Washington, D. C."